(12) United States Patent
Port et al.

(10) Patent No.: US 10,520,780 B2
(45) Date of Patent: Dec. 31, 2019

(54) ELECTROACTIVE DEVICE PROVIDED WITH A TRILAYER BUS BAR

(71) Applicant: SOUTHWALL TECHNOLOGIES INC., Palo Alto, CA (US)

(72) Inventors: Anthony Brian Port, Menlo Park, CA (US); Christian Herman Stoessel, Santa Rosa, CA (US); Richard Thomas Wipfler, Menlo Park, CA (US)

(73) Assignee: Southwall Technologies Inc., Palo Alto, CA (US)

( * ) Notice: Subject to any disclaimer, the term of this patent is extended or adjusted under 35 U.S.C. 154(b) by 43 days.

(21) Appl. No.: 15/797,309

(22) Filed: Oct. 30, 2017

(65) Prior Publication Data

US 2018/0173035 A1    Jun. 21, 2018

Related U.S. Application Data

(60) Provisional application No. 62/437,163, filed on Dec. 21, 2016.

(51) Int. Cl.
| | | |
|---|---|---|
| *G02F 1/1345* | (2006.01) | |
| *G02F 1/153* | (2006.01) | |
| *G02F 1/1343* | (2006.01) | |
| *H02G 5/00* | (2006.01) | |
| *E06B 3/67* | (2006.01) | |

(Continued)

(52) U.S. Cl.
CPC .......... *G02F 1/1345* (2013.01); *E06B 3/6722* (2013.01); *E06B 9/24* (2013.01); *G02F 1/13439* (2013.01); *G02F 1/153* (2013.01); *G02F 1/1533* (2013.01); *H02G 5/005* (2013.01); *B60J 3/04* (2013.01); *E06B 2009/2464* (2013.01); *G02F 1/1334* (2013.01); *G02F 1/1339* (2013.01); *G02F 1/155* (2013.01); *G02F 1/1523* (2013.01); *G02F 1/161* (2013.01);

(Continued)

(58) Field of Classification Search
CPC ..................................................... G02F 1/1345
See application file for complete search history.

(56) References Cited

U.S. PATENT DOCUMENTS 5,067,796 A * 11/1991 Suzuki ................ G02F 1/13452
349/149
5,073,011 A    12/1991 Ito et al.
(Continued)

OTHER PUBLICATIONS

PCT International Search Report and Written Opinion dated Feb. 19, 2018 for International Application No. PCT/US2017/064818.

*Primary Examiner* — Sang V Nguyen
(74) *Attorney, Agent, or Firm* — Michael K. Carrier (57) ABSTRACT

An electroactive package is disclosed that includes an active film and a pair of transparent conductive layers positioned on opposite sides of the active film. The transparent conductive layers each include an overhang section that extends beyond an edge of the active film, with the overhang sections being located at a periphery of the electroactive package. A bus bar is disclosed that comprises a pair of electrically-conductive layers and an insulative layer positioned between the electrically-conductive layers. The bus bar extends along at least a portion of the periphery of the electroactive package and is positioned between the overhang sections of the transparent conductive layers. Also disclosed are electroactive windows, and methods of making them.

11 Claims, 5 Drawing Sheets

(51) Int. Cl.
*E06B 9/24* (2006.01)
*G02F 1/155* (2006.01)
*B60J 3/04* (2006.01)
*G02F 1/1523* (2019.01)
*G02F 1/1334* (2006.01)
*H01R 4/00* (2006.01)
*G02F 1/161* (2006.01)
*G02F 1/1339* (2006.01)

(52) U.S. Cl.
CPC .. *G02F 2001/1557* (2013.01); *G02F 2202/28* (2013.01); *H01R 4/00* (2013.01)

(56) References Cited

U.S. PATENT DOCUMENTS

| | | | |
|---|---|---|---|
| 5,142,406 | A | 8/1992 | Lampert et al. |
| 5,416,622 | A * | 5/1995 | Engfer ............... G02F 1/1345 349/149 |
| 6,020,987 | A | 2/2000 | Baumann et al. |
| 6,178,034 | B1 | 1/2001 | Allemand et al. |
| 6,204,953 | B1 | 3/2001 | Zieba et al. |
| 6,268,950 | B1 | 7/2001 | Ash et al. |
| 6,277,523 | B1 | 8/2001 | Giron |
| 6,317,248 | B1 * | 11/2001 | Agrawal ............... G02F 1/155 340/438 |
| 6,366,391 | B1 | 4/2002 | Hurtz |
| 6,373,618 | B1 | 4/2002 | Agrawal et al. |
| 6,515,787 | B1 | 2/2003 | Westfall et al. |
| 6,545,794 | B2 | 4/2003 | Ash et al. |
| 6,639,708 | B2 | 10/2003 | Elkadi et al. |
| 6,665,107 | B2 | 12/2003 | Forgette et al. |
| 6,671,080 | B2 | 12/2003 | Poll et al. |
| 6,791,737 | B2 | 9/2004 | Giron |
| 6,795,226 | B2 | 9/2004 | Agrawal et al. |
| 6,822,778 | B2 | 11/2004 | Westfall et al. |
| 6,906,842 | B2 | 6/2005 | Agrawal et al. |
| 6,924,919 | B2 | 8/2005 | Hunia et al. |
| 7,196,834 | B2 | 3/2007 | Brabec et al. |
| 7,300,166 | B2 | 11/2007 | Agrawal et al. |
| 7,349,143 | B2 | 3/2008 | Tonar et al. |
| 7,511,872 | B2 | 3/2009 | Tonar et al. |
| 7,586,663 | B1 | 9/2009 | Radmard et al. |
| 7,733,555 | B2 | 6/2010 | Agrawal et al. |
| 8,115,984 | B2 | 2/2012 | Agrawal et al. |
| 8,243,357 | B2 | 8/2012 | Kozlowski et al. |
| 8,482,839 | B2 | 7/2013 | Zaghib et al. |
| 8,526,093 | B2 | 9/2013 | Miller |
| 8,559,092 | B2 | 10/2013 | Bugno et al. |
| 8,599,466 | B2 | 12/2013 | Agrawal et al. |
| 8,693,079 | B2 | 4/2014 | Agrawal et al. |
| 2002/0075552 | A1 * | 6/2002 | Poll ............... E06B 3/66 359/275 |
| 2003/0058225 | A1 * | 3/2003 | Kusuda ............... G06F 3/045 345/173 |
| 2012/0147449 | A1 * | 6/2012 | Bhatnagar ......... B32B 17/10055 359/275 |
| 2017/0222182 | A1 * | 8/2017 | Mo .................. H01L 51/524 |

* cited by examiner

ELECTROACTIVE DEVICE PROVIDED WITH A TRILAYER BUS BAR

CROSS-REFERENCE TO RELATED APPLICATIONS

This application claims the benefit of U.S. Provisional Patent Application Ser. No. 62/437,163 filed on Dec. 21, 2016, the entire disclosure of which is incorporated by reference herein.

BACKGROUND OF THE INVENTION

1. Field of the Invention

Embodiments of the present invention relate to an electroactive device or package that can be used in transparent windows or glazings. In more detail, embodiments of the present invention include a bus bar that provides electrical contact to conductive electrodes of an electroactive device while facilitating electrical isolation between the conductive electrodes.

2. Description of the Related Art

Electroactive devices are well known in the art for use in various applications. Electroactive devices broadly comprise electroactive materials that change properties, that generate an output, and/or that perform other functions under the application of a stimulus. For instance, a certain class of electroactive devices, referred to herein as electroactive dynamic devices, include electroactive materials that can change their optical transmittance, absorption, emittance, and/or reflectance under the influence of electrical stimulus. As such, these electroactive dynamic devices can be used in applications that require the electroactive material to change color and/or optical transmission. Such electroactive dynamic devices may include electrochromic devices, polymer-dispersed liquid crystal (PDLC) devices, and the like. In more detail, the electroactive material in electrochromic devices can include materials that can undergo darkening or lightening through electrochemically-induced oxidation-reduction reactions.

Another class of electroactive devices, referred to herein as electroactive voltaic devices, include electroactive materials that can generate electrical energy under the application of a stimulus. For instance, such electroactive voltaic devices may include photovoltaic devices, which generate an electric current when exposed to sunlight or other light sources.

Broadly, electroactive devices often comprise two substrates, such as two pieces of glass or other rigid or flexible substrates, separated by a space filled with an electroactive material. In more detail, electroactive devices typically include transparent electrically-conductive layers on opposite sides of the electroactive material. Such transparent conductive layers can be connected to electronic circuitry via electrical connections. In the case of electroactive voltaic devices, as electrical current is generated by the electroactive material, the electrical current can be transmitted via the electrical connections to the electronic circuitry. In contrast, in electroactive dynamic devices, when a voltage potential is applied by the electronic circuitry through the electrical connections and across the transparent conductive layers, the electroactive dynamic material is energized or de-energized (e.g., undergoes an oxidation-reduction reaction) and caused to change color. For example, when an electrochromic material is energized, it may be caused to darken. Alternatively, when an electrochromic material is de-energized, it may be caused to lighten. It should be understood that the term "dynamic" in the term electroactive dynamic devices is used to mean that the optical changes produced by the electroactive dynamic devices are actively induced, such as by the application of the voltage potential via the electronic circuitry mentioned above. Such dynamic devices operate differently than passive devices, which may undergo electroactive changes in a passive matter. For instance, an example of a passive device might include a photochromic lens for eyeglasses/sunglasses, which passively darkens when placed in or exposed to sunlight. Specifically, such a photochromic lens may include silver halide embedded therein, which darkens when exposed to ultraviolet (UV) light from the sun.

Electroactive devices may commonly be used in vehicle applications, such as windshields, windows, sunroofs, and mirrors, as well as other transparent window applications, such as architectural windows. With such applications for electroactive devices, various types and configurations of electrical connections have been used to transmit the voltage potential to/from the transparent conductive electrodes (or layers) and the electroactive material. However, such previously-used electrical connections have numerous drawbacks.

A common, previously-used method for providing an electrical connection to the transparent conductive layers includes embedding wires through laminating adhesive used to laminate the electroactive devices within glass substrates. While this method works well for single-line conductors, such as used for windshield heating or de-icing, the method is generally not feasible for providing connections to two, opposing transparent conductive layers.

Providing an electrical connection to two, opposing transparent conductive layers is often accomplished by extending the transparent conductive layers beyond the active area, i.e., the area where the transparent conductive layers are in contact with the electroactive material. As such, electrical connections can be made at the peripheral portions of the transparent conductive layers that extend past the active area. However, such extending of the transparent conductive layers beyond the active area poses several problems. For instance, the portions of the two transparent conductive layers that extend past the active area generally face each other and are, thus, exposed to electrical short-circuits. This may be mitigated by cutting back one of the two transparent conductive layers, through use of insulators around the transparent conductive layers, and/or by contacting only one transparent conductive layer in any specific area along the periphery of the electroactive device. However, such standard mitigation options limit the active current-carrying capability of the electrical connection to the transparent conductive layers, which may increase the switching time of the electroactive device. Furthermore, in electroactive dynamic devices, such options have been known to introduce visible "lensing" or "iris" effects through portions of the electroactive dynamic device. Specifically, such "iris" effects are presented as changes in color between the periphery and the center of the electroactive dynamic devices.

Furthermore, making electrical connections directly at the periphery of the transparent conductive layers with solder or electrically conductive adhesive or tape can cause breakage, fracture, or delamination of the often thin and brittle transparent conductive layers, which can create unreliable connections and device malfunctions/failures. Such problems may also occur during glass lamination. Additionally, certain modifications performed to the transparent conductive layers (e.g., cutting back portions the transparent conductive layers) can create undesirable linear stress concentrations along the periphery of the transparent conductive layers. Such stresses can be enhanced by subsequent strains from glass layup, de-airing, and lamination pressures. Such strains may also arise during mechanical and thermal cycling of the electroactive device during its service life.

Accordingly, a need exists for electroactive devices that include components that facilitate reliable electrical connections to the transparent conductive layers, while simultaneously providing electrical separation between the individual transparent conductive layers. Furthermore, there is a need for electroactive devices that facilitate such electrical connections while maintaining the structural and functional integrity of the transparent conductive layers during manufacture and through the operational life of the electroactive devices.

SUMMARY

Embodiments of the present invention include an electroactive device, an electroactive package, and a trilayer bus bar or biconductive bus bar ("bus bar"). The electroactive package may comprise an active film and a pair of transparent conductive layers positioned on opposite sides of the active film. The transparent conductive layers each include an overhang section that extends beyond an edge of the active film, with the overhang sections being located at a periphery of the electroactive package. A bus bar comprises a pair of electrically-conductive layers and an insulative layer positioned between the electrically-conductive layers. The bus bar extends along at least a portion of the periphery of the electroactive package or device and is positioned between the overhang sections of the transparent conductive layers. Each of the electrically-conductive layers includes an inner edge separated from an outer edge by a width of the electrically-conductive layer, and the insulative layer includes an inner edge separated from an outer edge by a width of the insulative layer. As such, the inner edges of the electrically-conductive layers and the insulative layer are generally aligned, and the outer edges of the electrically-conductive layers and the insulative layer are generally aligned. Furthermore, the bus bar extends around more than half of the periphery of the electroactive package.

Embodiments additionally include a method of producing an electroactive window or glazing. The method comprises an initial step of providing a substrate layer. A next step includes applying an electroactive package to the substrate layer, with the electroactive package including a pair of transparent conductive layers opposing an active film. The electroactive package includes a peripheral space extending around at least a portion of its periphery, with such peripheral space presented between overhang sections of the pair of transparent conductive layers that extend beyond the active film. The method includes a further step of inserting a bus bar in the peripheral space, with the bus bar comprising a pair of electrically-conductive layers opposing an insulative layer. Each of the electrically-conductive layers includes an inner edge separated from an outer edge by a width of the electrically-conductive layer, and the insulative layer includes an inner edge separated from an outer edge by a width of the insulative layer. As such, the inner edges of the electrically-conductive layers and the insulative layer are generally aligned, and the outer edges of the electrically-conductive layers and the insulative layer are generally aligned. Furthermore, the bus bar extends around more than half of the periphery of the electroactive package.

Embodiments of the present invention additionally include an electroactive window comprising an active film, a first transparent conductive layer, and a second transparent conductive layer. The first transparent conductive layer includes an interior or electroactive contact surface at least partially in contact with an upper surface of the active film. The interior or electroactive contact surface of the first transparent conductive layer extends along an overhang section of the first transparent conductive layer, with such overhang section extending beyond said active film. The second transparent conductive layer likewise includes an interior or electroactive contact surface at least partially in contact with a lower surface of the active film. The interior or electroactive contact surface of the second transparent conductive layer extends along an overhang section of the second transparent conductive layer, with such overhang section extending beyond said active film. The electroactive window further comprises a bus bar positioned between the overhang section of the first transparent conductive layer and the overhang section of the second transparent conductive layer. The bus bar comprises an insulative layer, as well as a first electrically-conductive layer and a second electrically-conductive layer opposing the insulative layer. An exterior surface of the first electrically-conductive layer is in contact with a substantial portion of the electroactive contact surface of the first transparent conductive layer along the overhang section, and an exterior surface of the second electrically-conductive layer is in contact with a substantial portion of the electroactive contact surface of the second transparent conductive layer along the overhang section. Furthermore, a thickness of the bus bar matches a thickness of the active film. As used herein, the terms interior and exterior are understood to be in relation to their distance from the active film, or from the insulative layer of the bus bar, as the case may be.

Embodiments of the present invention further comprise an electroactive glazing comprising an active film including a first major surface and a second major surface. The electroactive glazing additionally comprises a first transparent conductive layer with an electroactive contact surface at least partially in contact with the first major surface of the active film. The electroactive contact surface of the first transparent conductive layer extends along an overhang section of the first transparent conductive layer, with such overhang section extending beyond said active film. The electroactive glazing additionally comprises a second transparent conductive layer with an electroactive contact surface at least partially in contact with the second major surface of the active film. The electroactive contact surface of the second transparent conductive layer extends along an overhang section of the second transparent conductive layer, with such overhang section extending beyond said active film. The electroactive glazing further comprises a bus bar positioned between the overhang section of the first transparent conductive layer and the overhang section of the second transparent conductive layer. The bus bar comprises an insulative layer, as well as a first electrically-conductive layer and a second electrically-conductive layer opposing the insulative layer. An exterior surface of the first electrically-conductive layer is in contact with a substantial portion of the electroactive contact surface of the first transparent conductive layer along the overhang section, and an exterior surface of the second electrically-conductive layer is in contact with a substantial portion of the electroactive contact surface of the second transparent conductive layer along the overhang section. The exterior surface of the first electrically-conductive layer is generally coplanar with the first major surface of the active film, and an exterior surface of the second electrically-conductive layer is generally coplanar with the second major surface of the active film.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
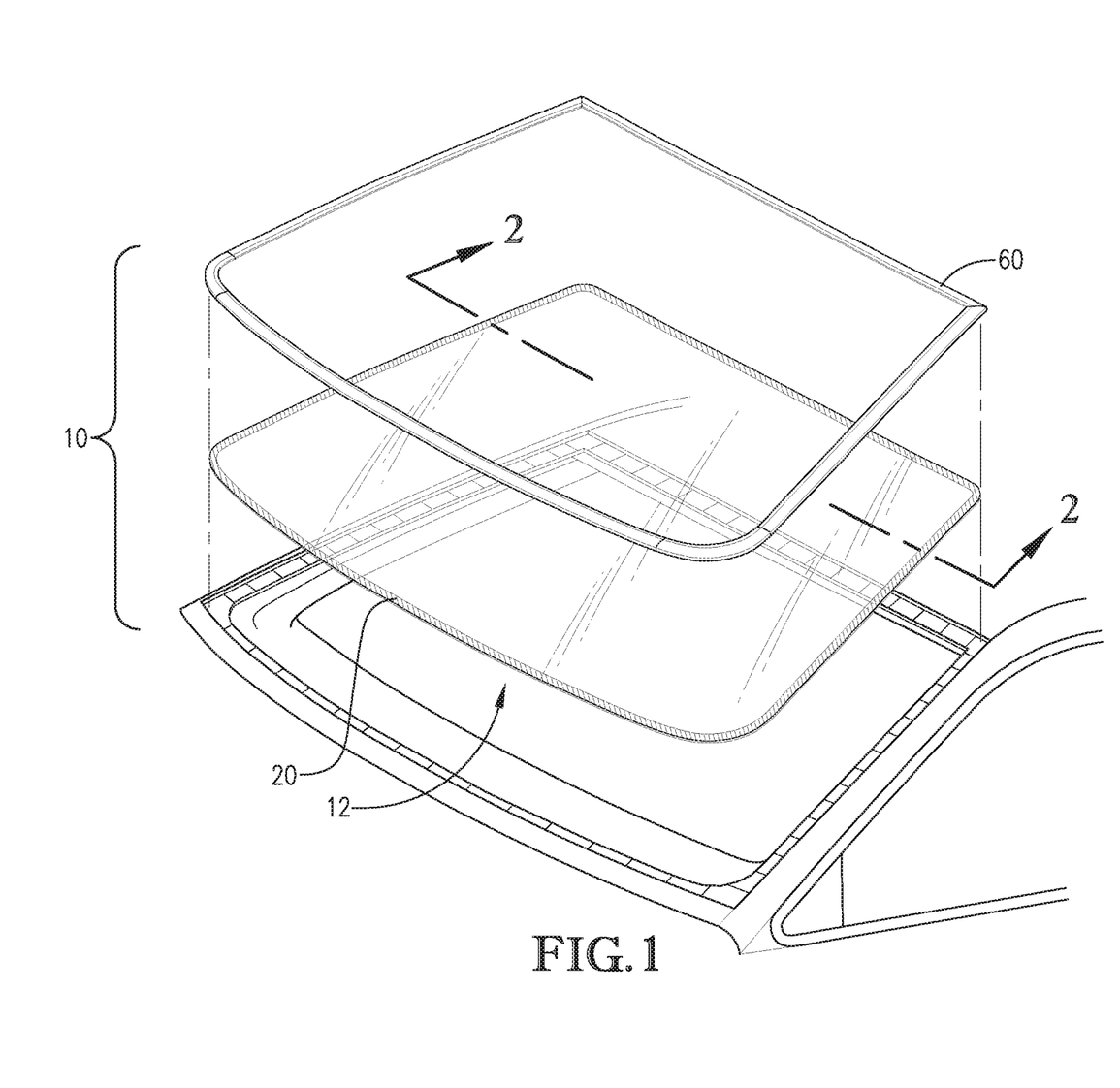
FIG. 1 is a partial exploded view of a vehicle windshield including an electroactive device according to embodiments of the present invention.

Embodiments of the present invention are directed to an electroactive device that can be used in window transparencies or glazings, such as the vehicle windshield 10 illustrated in FIG. 1. The electroactive device may also be used in other types of vehicle windows (e.g., sunroofs, moonroofs, side windows, etc.) and light fixtures. Nevertheless, it should be understood that the electroactive device of embodiments of the present invention can also be used in other transparent window or glazing applications, such as in architectural windows. As used in the vehicle windshield 10, the electroactive device may include an electroactive dynamic device (e.g., electrochromic or PDLC), which can function to selectively change the color of the vehicle windshield 10. For instance, the vehicle windshield 10 can be caused to darken or lighten, so as to restrict or increase, respectively, the amount of light permitted to be transmitted therethrough. As was described previously, the term "dynamic" in the phrase electroactive dynamic devices is used herein to mean that the electroactive state of the electroactive device can be actively caused to change (e.g., darken or lighten), such as through the application of a voltage potential and resulting current flow by electronic circuitry discussed in more detail below. Although much of the description provided below is provided with respect to the electroactive device 12 being an electroactive dynamic device, such as an electrochromic or PDLC device, it should be understood that embodiments of the present invention also contemplate the electroactive device 12 being an electroactive voltaic device, such as a photovoltaic device.

Figure 2:
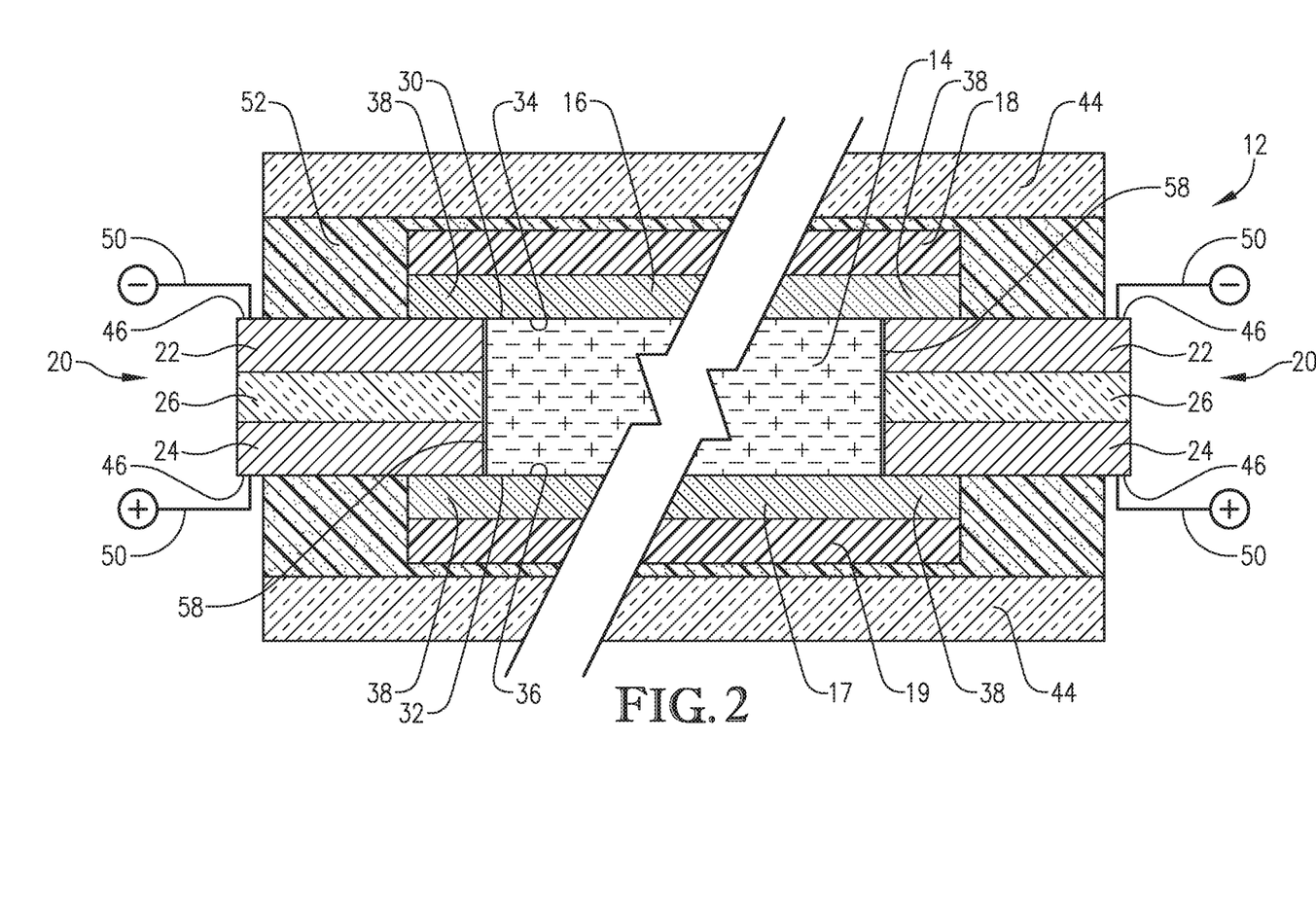
FIG. 2 is a cross-sectional view of the vehicle windshield of FIG. 1 taken along the line 2-2, particularly showing the electroactive device within the vehicle windshield.

Remaining with FIG. 1, the vehicle windshield 10 includes an electroactive device 12 integrated therein. The electroactive device 12 is illustrated in more detail in the cross-section view of FIG. 2. With reference to FIG. 2, the electroactive device 12 may broadly comprise an active film 14, a pair of transparent conductive layers 16, 17 positioned on opposite sides of the active film 14, a pair of polymer layers 18, 19 opposing the transparent conductive layers 16, 17 and the active film 14, and a bus bar 20 extending along at least a portion of the periphery the electroactive device 12 and positioned between the transparent conductive layers 16, 17. The bus bar 20 extending around the periphery of the electroactive device 12 is perhaps best shown in FIG. 1. The bus bar 20 may be formed as a trilayer, comprising a pair of electrically-conductive layers 22, 24, and an insulative layer 26 positioned between the electrically-conductive layers, 22, 24. Because the bus bar 20 may include the pair of electrically-conductive layers 22, 24, which are each independently conductive, the bus bar 20 may be considered biconductive.

Embodiments of the present invention contemplate that the electroactive device 12 can be used in a transparent window or a glazing, such as the vehicle windshield 10 illustrated in FIG. 1. The bus bar 20 of the electroactive device 12 can be used to provide electrical connections to the pair of transparent conductive layers 16, 17, such that a voltage potential can be applied between the transparent conductive layers 16, 17 and across the active film 14 positioned therebetween. As such, in the embodiment of the electroactive device 12 being an electroactive dynamic device, current can be caused to flow through the active film 14, thereby energizing or de-energizing the active film (i.e., to undergo an oxidation-reduction reaction), and causing it to selectively change its color. As such, for instance, the electroactive device 12 can selectively darken or lighten the vehicle windshield 10. The electroactive device 12 may include a pair of polymer layers 18, 19 opposing the transparent conductive layers 16, 17 and the active film 14, or more specifically, in embodiments, the transparent conductive layers 16, 17 maybe be formed on the polymer layers 18, 19. The polymer layers 18, 19, may comprise various types of generally transparent polymers, such as polyethylene terephthalate (PET). In more detail, the transparent conductive layer 16 may be positioned on or formed on the polymer layer 18 opposite the active film 14, and the transparent conductive layer 17 may be formed on the polymer layer 19, opposite the active film 14. As such, the electroactive device 12 can, in some embodiments, be configured as an electroactive package multilayer (the "electroactive package") that comprises the transparent conductive layers 16, 17 supported on (or formed on) the polymer layers 18, 19, respectively, and with the active film 14 positioned between and supported by the transparent conductive layers 16, 17.

Remaining with embodiments in which the electroactive device 10 is an electroactive dynamic device, the active film 14 may include any type of electroactive material that can change its optical transmittance, absorption, emittance, and/or reflectance under the influence of an applied voltage potential and/or an induced current flow. For instance, the active film 14 may be formed from electrochromic material such as tungsten oxides, polymer-dispersed liquid crystal (PDLC) material, or the like. In more detail, certain electrochromic materials, such as tungsten oxide or tungsten trioxide, are used in devices that may be considered "current-driven," as their operation is dependent on generally high current flows for purposes of generating chemical reactions (e.g., oxidation-reduction) within the electrochromic materials. Other suitable electrochromic materials include other transition metal oxides such as nickel oxide, polyanilines, and viologens. Such "current-driven" devices generally require low voltages (e.g., less than 5 Volts DC) and may offer relatively slow switching operations or speeds. In contrast, certain PDLC materials are used in devices that may be considered "field-driven," as their operation is dependent on generally high voltage potentials for purposes of generating structural changes (e.g., liquid crystal alignment) within the PDLC materials. Such "field-driven" devices generally require high voltages (e.g., 30-100 Volts AC) and may offer relatively fast switching operations.

Figure 3:
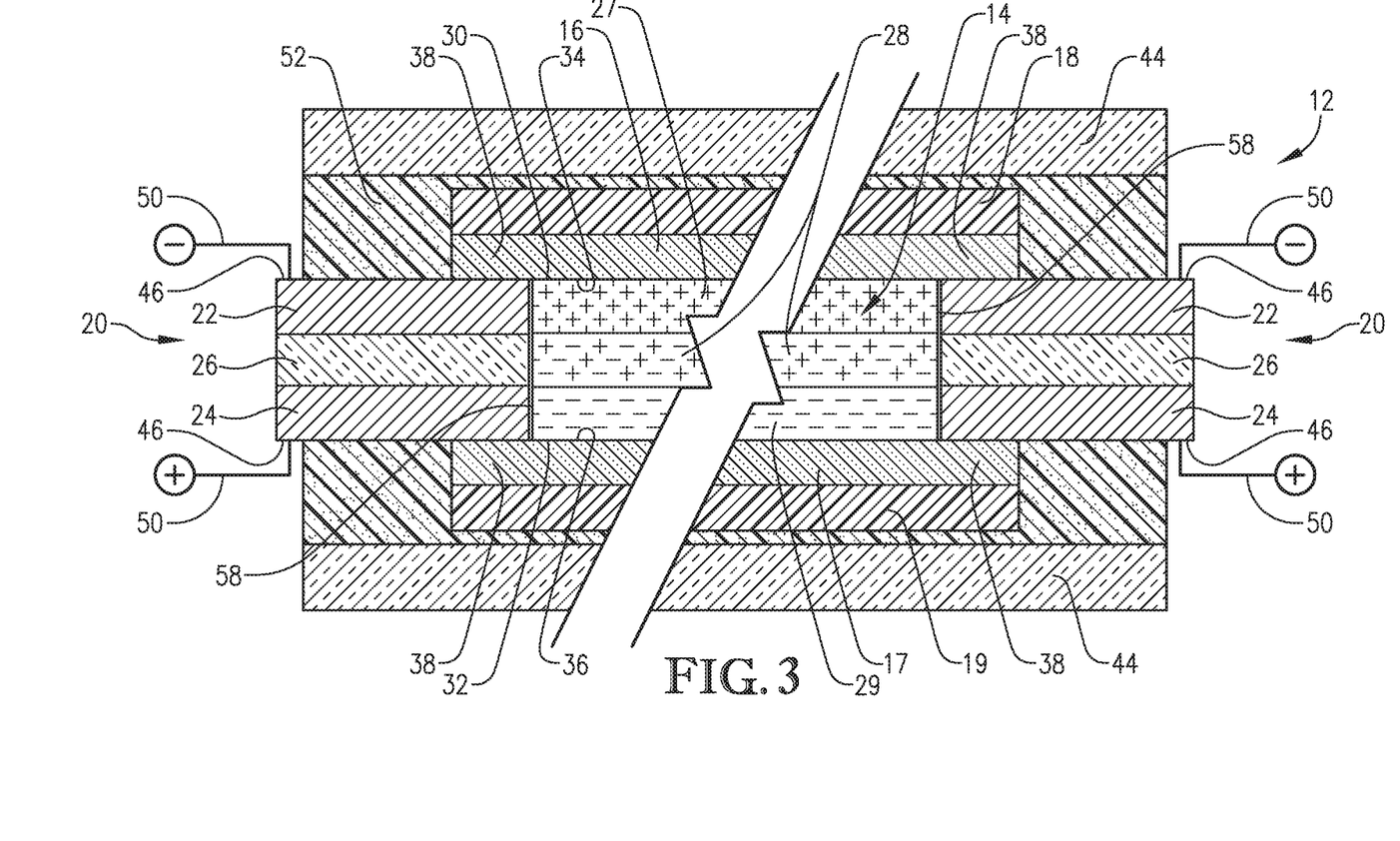
FIG. 3 is a cross-sectional view of the electroactive device from FIG. 2, particularly illustrating an active film of the electroactive device being an electrochromic film, which comprises an electrochromic layer, an electrolyte layer, and an ion storage layer.

In some specific embodiments of the present invention directed to electroactive dynamic devices, the active film 14 may comprise a solid or semi-solid (e.g., gel) matrix. For instance, as illustrated in FIG. 3, the active film 14 may comprise an electrochromic film with three individual layers, including an electrochromic layer 27 (e.g., tungsten oxide or titanium dioxide), an electrolyte layer 28, and an ion storage layer 29. In other embodiments, the active film 14 may include more or less than three individual layers. In still other embodiments, such as when the electroactive device 10 is an electroactive voltaic device, the active film 14 may include any other type of electroactive material that can generate an electrical current under the influence of specific conditions. For instance, for photovoltaic devices, the active film 14 may be formed from photovoltaic materials that exhibit the photovoltaic effect, which may include monocrystalline silicon, polycrystalline silicon, amorphous silicon, cadmium telluride, copper indium gallium selenide/sulfide, or the like.

In embodiments, when the active film 14 comprises an electrochromic film with three individual layers, including an electrochromic layer 27, an electrolyte layer 28, and an ion storage layer 29 (or second electrochromic layer), and the active film is part of an electroactive device 12, it can be further described as having one side that is the working electrode, and the other side is the counter electrode. Referring to FIG. 3, the working electrode would consist of the polymer layer 18, the transparent conductive coating 38, and the electrochromic layer 27, and the counter electrode would consist of the polymer layer 19, the transparent conductive coating 38, and the ion storage layer 29. The two electrodes are connected by the electrolyte layer 28 (also referred to as the conducting electrolyte). The electroactive device 12 can then be encapsulated between an adhesive (such as a laminating adhesive 52) as further described below and then laminated between glass or other rigid substrates. The active film 14 may comprise a first major surface 30 separated from a second major surface 32 by a thickness of the active film 14. The active film 14 may have varying thicknesses depending on the requirements of the electroactive device 12. For example, some embodiments may provide for the active film 14 to have a thickness of between 5 and 50 microns (between 0.197 to 1.967 thousands of an inch), between 6 and 40 microns (between 0.236 to 1.575 thousands of an inch), between 7 and 30 microns (between 0.276 to 1.181 thousands of an inch), between 8 and 20 microns (between 0.315 to 0.787 thousands of an inch), between 9 and 15 microns (between 0.354 to 0.591 thousands of an inch), or about 10 microns (0.394 thousands of an inch). In other embodiments, the thickness of the active film 14 may be at least 10 microns (0.394 thousands of an inch), at least 15 microns (0.591 thousands of an inch), at least 20 microns (0.787 thousands of an inch), at least 30 microns (1.181 thousands of an inch), at least 40 microns (1.575 thousands of an inch), or at least 50 microns (1.967 thousands of an inch).

The transparent conductive layers 16, 17 may be formed from any type of electrically-conductive material that has sufficient transparency to be used in transparent window or glazing applications. For example, in some embodiments, the transparent conductive layers 16, 17 may comprise various forms of transparent conductive oxides, such as tin oxide, zinc oxide, doped oxides (e.g., indium doped oxides of tin or zinc), or the like, or combinations thereof. As illustrated in FIG. 2, the transparent conductive layer 16 may include an electroactive contact surface 34 in contact with the first major surface 30 of the active film 14. Similarly, the transparent conductive layer 17 may include an electroactive contact surface 36 in contact with the second major surface 32 of the active film 14. Furthermore, the transparent conductive layers 16, 17 may have a length and/or width that is longer than a length and/or width of the active film 14, such that the transparent conductive layers 16, 17 extend beyond the periphery or edges of the active film 14. As such, each of the transparent conductive layers 16, 17 present overhang sections 38, which overhang the active film 14. Similarly, it should be understood that a portion of the electroactive contact surfaces 34, 36 of the transparent conductive layers 16, 17 is included with the overhang sections that overhangs the active film 14. Such portions of the electroactive contact surfaces 34, 36 may face each other at any given position about the periphery of the electroactive device 12.

FIG. 2 shows the transparent conductive layers 16, 17 having overhang sections 38 on opposite sides of the electroactive device 12. However, it should be understood that FIG. 2 is a cross-sectional view of FIG. 1, and the transparent conductive layers 16, 17 may include overhang sections 38 around the entire periphery of the electroactive device 12, as the electroactive device 12 extends about the transparent window or glazing (e.g., vehicle windshield 10). The overhang sections 38 of the transparent conductive layers 16, 17, in conjunction with the active film 14, present and define a peripheral space, which as shown in FIG. 2, can be filled, at least in part, with the bus bar 20.

Beneficially, such an electroactive package can be formed in a roll-to-roll configuration, such that the electroactive device 12 can be formed by rolling out a section of electroactive package and cutting it to a specific size for a particular end use (e.g., the vehicle windshield 10). As will be described in more detail below, the electroactive device 12, as formed from the electroactive package, can be laminated to opposing substrates 44, such as layers of glass that form the vehicle windshield 10. To provide the electroactive functionality of the electroactive device 12, the transparent conductive layers 16, 17 should be provided with electrical connections. As such, in electroactive dynamic devices, the electrical connections can be used to generate a voltage potential across the active film 14 and to induce a current flow therethrough. As will be described in more detail below, the bus bar 20 of embodiments of the present invention is configured to provide such electrical connections.

As noted above, the bus bar 20 may comprise the pair of electrically-conductive layers 22, 24 and the insulative layer 26 positioned therebetween. The insulative layers may comprise various types of materials with sufficient electrically-insulative properties so as to electrically isolate the pair of electrically-conductive layers 22, 24. For instance, the insulative layer 26 may be formed from polyvinyl butyral (PVB), polyimide, polyethylene terephthalate (PET), or the like. In some embodiments, the insulative layer may be formed from more common insulators, such as paper or other wood products. In some embodiments, the insulative layer 26 may be formed from a material that is generally flexible. As such, the insulative layer 26 may be configured to flex about an axis parallel to its major surfaces (i.e., a horizontal axis when viewing the illustration of FIG. 2). It is understood that the major surfaces of the insulative layer are the surfaces in contact with the electrically-conducting layers 22, 24. Alternatively, or in conjunction, the insulative layer 26 may be configured to flex about an axis perpendicular to its major surfaces (i.e., a vertical axis when viewing the illustration of FIG. 2). Such flexibility may be further enhanced by forming serrations through at least portions of the bus bar 20. As will be described in more detail below, the ability of the bus bar to flex allows the electroactive device 12 to be incorporated into applications (e.g., window transparencies or glazings) that have curved or other non-flat contours. Nevertheless, embodiments of the present invention may include an insulative layer 26 that is formed from rigid materials, such that the bus bar 20 is rigid.

The electrically-conductive layers 22, 24 of the bus bar 20 may comprise various types of electrically-conductive materials, such as copper, nickel, aluminum, alloys thereof, as well as conducting polymers and conductive inks (e.g., silver ink). In general, the electrically-conductive layers 22, 24 should be electrically compatible with the transparent conductive layers 16, 17, so as to provide a consistent electrical connection thereto. In some embodiments, it may be preferred that the electrically-conductive layers 22, 24 be non-corrosive (e.g., difficult to oxidize), such as metals that are sufficiently noble. The electrically-conductive layers 22, 24 may be formed on the insulative layer 26 by various application methods, such as by sputtering, electroplating, printing, or the like. In some embodiments, the electrically-conductive layers 22, 24 may be formed so as to have exterior surfaces 46 (i.e., surfaces opposite the insulative layer 26) that are generally contiguous. In other embodiments, the electrically-conductive layers 22, 24 may be formed so as to have exterior surfaces 46 that are patterned.

In some embodiments, such as when sputtering is used to form the electrically-conductive layers 22, 24, the electrically-conductive layers 22, 24 may be formed on the insulative layer 26 such that all layers of the bus bar 20 have generally equal widths. Specifically, for instance, the insulative layer 26 may be formed to include an inner edge separated from an outer edge by a width (i.e., a horizontal distance in FIG. 2) of the insulative layer 26. Similarly, each of the electrically-conductive layers 22, 24 may be sputter coated on the insulative layer 26 such that it includes an inner edge separated from an outer edge by a width (i.e., a horizontal distance in FIG. 2) of the electrically-conductive layer 22, 24. Stated another way, inner edges (i.e., edges adjacent to the active film 14) of the electrically-conductive layers 22, 24 and of the insulative layer 26 may be generally aligned, while the outer edges (i.e., edges extending away from the active film 14) of the electrically-conductive layers 22, 24 and of the insulative layer 26 are also generally aligned.

The bus bar 20 may be positioned around the periphery of the electroactive device 12 so as to provide electrical connection to the transparent conductive layers 16, 17 around the periphery of the electroactive device 12. In some embodiments, as illustrated in FIG. 1, the bus bar 20 may be positioned around the entire periphery of the electroactive device 12 (as integrated in the vehicle window 10). In such embodiments, the bus bar 20 may be formed as a continuous loop, annulus, ring, or other closed shape. In other embodiments, the bus bar 20 may not form a continuous, closed shape. Instead, the bus bar 20 may be formed of two or more sections or segments, which are arranged around the entire periphery of the electroactive device 12. For example, the bus bar 20 may be formed as a plurality of generally linear segments (e.g., four linear segments arranged in a rectangular fashion). As further alternatives, such sections of the bus bar 20 may be formed in other shapes so as to surround the periphery of the electroactive device 12, such as, for instance, two "L" shaped sections arranged in a rectangular fashion. As such, the bus bar 20 may be positioned around the entire periphery of the electroactive device 12 so as to provide electrical connection to the transparent conductive layers 16, 17 around their entire periphery. Alternatively, in some embodiments, the bus bar 20 may not surround the entire periphery of the electroactive device 12. Regardless, embodiments of the present invention may provide that the bus bar 20 may surround at least 40%, at least 45%, at least 50% (i.e., at last half), at least 55%, at least 60%, at least 65%, at least 70%, at least 75%, at least 80%, at least 85%, at least 90%, at least 95%, at least 98%, or at least 99% of the periphery of the electroactive device 12.

Furthermore, the exterior surface 46 of each of the electrically-conductive layers 22, 24, may be in contact with a substantial portion of the overhang section 38 of the electroactive contact surface of respective transparent conductive layers 16, 17. Specifically, exterior surface 46 of the electrically-conductive layer 22 may be in contact with a substantial portion of the overhang section 38 of the electroactive contact surface of the transparent conductive layer 16, while an exterior surface 46 of the electrically-conductive layer 24 may be in contact with a substantial portion of the overhang section of the electroactive contact surface of the transparent conductive layer 17. As used herein, the term "substantial portion" should be interpreted to mean that the exterior surfaces 46 of each of the electrically-conductive layer 22, 24 cover at least 75%, at least 80%, at least 90 percent, at least 95%, or at least 99% of the surface area of the overhang section 38 of the electroactive contact surface of respective transparent conductive layers 16, 17. As previously described, the overhang sections 38 of the transparent conductive layers 16, 17 may be formed generally around the entire periphery of the electroactive device 12. As such, the "substantial portion" of the surface area of the overhang section 38 would include the surface area around the entire periphery of the electroactive device 12.

In addition, however, when viewing a cross-section of the electroactive device 12, such as in FIG. 2, the exterior surfaces 46 of the electrically-conductive layers 22, 24 are illustrated in the form of line segments, as are the overhang sections 38 of the electroactive contact surfaces of the transparent conductive layer 16, 17. In such instances, the exterior surfaces 46 of the electrically-conductive layers 22, 24 may nonetheless make contact with a substantial portion of the overhang sections 38 of the respective electroactive contact surface of the transparent conductive layer 22, 24. As used in such cases, the term "substantial portion" should be interpreted to mean that each of the electrically-conductive layers 22, 24 cover at least 75%, at least 80%, at least 90%, at least 95%, or at least 99% of the line segment of the overhang section 38 of the electroactive contact surface of the respective transparent conductive layers 16, 17.

Embodiments of the present invention may additionally provide for the bus bar 20 to have a thickness that generally matches the thickness of the active film 14. As such, for instance, the bus bar 20 may have a thickness of between 5 and 50 microns (between 0.197 to 1.967 thousands of an inch), between 6 and 40 microns (between 0.236 to 1.575 thousands of an inch), between 7 and 30 microns (between 0.276 to 1.181 thousands of an inch), between 8 and 20 microns (between 0.315 to 0.787 thousands of an inch), between 9 and 15 microns (between 0.354 to 0.591 thousands of an inch), or about 10 microns (0.394 thousands of an inch). In other embodiments, the thickness of the bus bar 20 may be at least 10 microns (0.394 thousands of an inch), at least 15 microns (0.591 thousands of an inch), at least 20 microns (0.787 thousands of an inch), at least 30 microns (1.181 thousands of an inch), at least 40 microns (1.575 thousands of an inch), or at least 50 microns (1.967 thousands of an inch).

To accomplish such a matching between the thicknesses of the bus bar 20 and the active film 14, the bus bar 20 may be directly formed to match the thickness of the active film 14. For instance, starting with the insulative layer 26, the electrically-conductive layers 22, 24 can be applied thereto, e.g., via sputtering, electroplating, etc., until the thickness of the bus bar 20 generally matches that of the active film 14. In other embodiments, the bus bar 20 may include one or more compressible layers, such as the insulative layer 26. In such embodiments, when the bus bar 20 is inserted between the transparent conductive layers 16, 17, if the thickness of the bus bar 20 thickness is larger than that of the active film 14, the bus bar 20 will, nonetheless, be compressed by the transparent conductive layers 16, 17 until its thickness generally matches the thickness of the active film 14. In still further embodiments, the insulative layer 26 of the bus bar 20 may be formed from a material that has a glass transition temperature appropriate to allow the insulative layer 26 to be deformable at one or more of the temperatures used during the lamination of the electroactive device 12 within the transparent window or glazing. As such, even if the bus bar 20 is initially thicker than the active film 14, during lamination of the electroactive device 12 within the transparent window or glazing, the insulative layer 26 will soften and/or melt as a result of the temperatures used during lamination, such that the bus bar 20 will be compressed, upon insertion between the transparent conductive layers 16, 17, until its thickness generally matches the thickness of the active film 14

Because, in some embodiments, the thickness of the bus bar 20 matches the thickness of the active film 14, the exterior surfaces 46 of the electrically-conductive layers 22, 24 may be generally coplanar with the major surfaces 30, 32, respectively, of the active film 14. Such a configuration, with the exterior surfaces 46 of the electrically-conductive layers 22, 24 being coplanar with the major surfaces 30, 32, provides for the exterior surfaces 46 to be in contact with the overhang sections 38 of the transparent conductive layers 16, 17, as was previously described. Specifically, such a configuration permits the exterior surfaces 46 to be in contact with a "substantial portion" of the overhang sections 38 of the transparent conductive layers 16, 17, as was previously described.

Furthermore, because the thickness of the bus bar 20 can be configured to match the thickness of the active film 14, the electrically-conductive layers 22, 24 can be in contact with the transparent conductive layers 16, 17 without requiring modifications of the transparent conductive layers 16, 17. For example, no portion of the transparent conductive layers 16, 17 are required to be cut back or otherwise re-sized/re-shaped to facilitate the insertion of and the connection with the bus bar 20. As such, each of the transparent conductive layers 16, 17 can include a generally uniform thickness across their extent about the electroactive device 12. By providing a uniform thickness, the current-carrying capabilities of the transparent conductive layers 16, 17 can be maintained at high and uniform levels across their extent about the electroactive device 12. Furthermore, the structural integrity of the transparent conductive layers 16, 17 can be maintained during manufacture and operational life of the transparent window or glazing.

Finally, as illustrated in FIG. 2, embodiments of the present invention provide for the electroactive device 12 to include one or more electrically-conductive wires 50 to be attached to the bus bar 20. The electrically-conductive wires 50 can be connected to electrical components (not shown), such as a power source or power storage/power transfer element, opposite the bus bar 20, directly or indirectly. As such, for instance, the electrically-conductive wires 50 can be used in an electroactive dynamic device to transmit a voltage potential across portions of the electroactive device 12. Specifically, the electroactive device 12 may, in some embodiments, include at least two electrically-conductive wires 50 attached to the bus bar 20, with one electrically-conductive wire 50 being connected to each of the electrically-conductive layers 22, 24 of the bus bar 20. Thus, through the electrically-conductive wires 50 and the electrically conductive layers 22, 24, a voltage potential can be applied between the transparent conductive layers 16, 17 and across the active film 14, such that an electrical current can be induced through the active film 14. In alternative embodiments, such as in electroactive voltaic devices, the electrically-conductive wires 50 can be used to transmit an electric current from the electroactive device 12 (via the transparent conductive layers 16, 17 and the electrically-conductive layers 22, 24) to a power storage/power transfer element.

As previously described, in some embodiments, the bus bar 20 may extend around the entire periphery of the electroactive device 12. As such, even in embodiments in which only two electrically-conductive wires 50 are connected to the bus bar 20, such embodiments may be sufficient to provide an electrical connection with the transparent conductive layers 16, 17 around the entire periphery of the electroactive device 12. Beneficially, the ability to create an electrical connection around the entire periphery of the electroactive device 12 may enhance the speed at which the electroactive device 12 can be selectively operated (e.g., transitioned from light to dark or from dark to light because an electrical current can be induced through the active film 14 in a more uniform manner). Nevertheless, in other embodiments, the electroactive device 12 may include a plurality of pairs of electrically-conductive wires 50 positioned at various locations around the periphery of the electroactive device 12 for purposes of more evenly applying a voltage potential across (and an electrical current through) the active film 14 via the opposite transparent conductive layers 16, 17.

Figure 4:
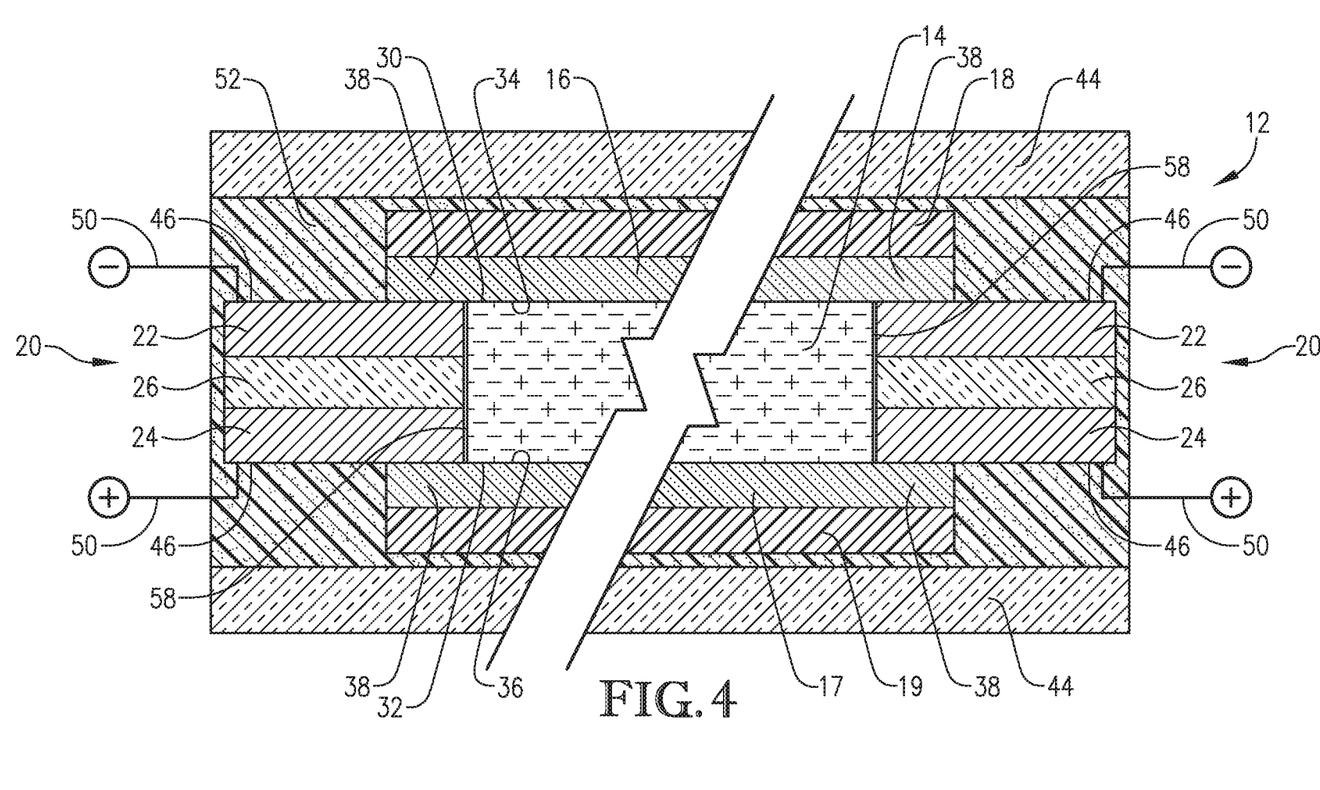
FIG. 4 is cross-sectional view of an additional embodiment of an electroactive device within a transparent window.
Figure 5:
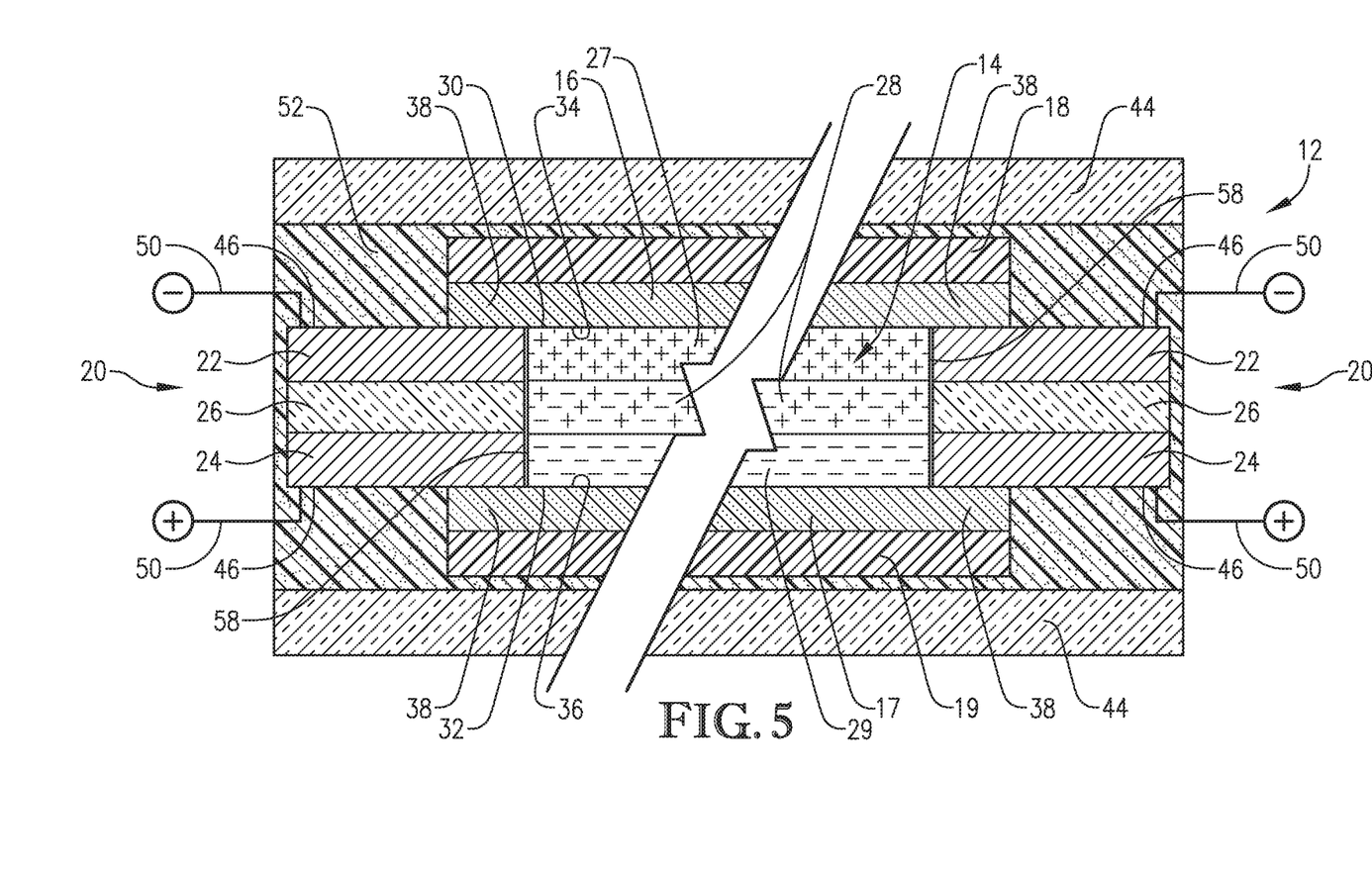
FIG. 5 is a cross-sectional view of the electroactive device from FIG. 4, particularly illustrating an active film of the electroactive device being an electrochromic film, which comprises an electrochromic layer, an electrolyte layer, and an ion storage layer The drawing figures do not limit the present invention to the specific embodiments disclosed and described herein. The drawings are not necessarily to scale, emphasis instead being placed upon clearly illustrating the principles of the invention.

The electrically-conductive wires 50 may comprise various materials, such as metal (e.g., copper) wires, electrically-conductive tape, or the like. The electrically-conductive wires 50 may be attached to the electrically-conductive layers 22, 24 of the bus bar 20 via various methods of attachment, such as by solder, adhesives, or the like. In some embodiments, such as illustrated in FIGS. 2 and 3, the electrically-conductive wires 50 may be coupled to the electrically-conductive layers 22, 24 at contact points positioned outside of a laminating adhesive 52 that may be used to laminate the electroactive device 12 to the substrates 44. As will be described in more detail below, the laminating adhesive 52 may comprise PVB or other material. In other embodiments, as shown in FIGS. 4 and 5, the electrically-conductive wires 50 may be coupled to the electrically-conductive layers 22, 24 at contact points located within the laminating adhesive 52. In embodiments, the laminating adhesive 52 may completely surround the bus bar and electrochromic device, such that the laminating adhesive 52 stops or ends at the same general point as the substrates 44. FIG. 5 illustrates an embodiment of the electroactive device 12 with the electrically-conductive wires 50 coupled, that includes the active film 14 with each of the electrochromic layer 27, the electrolyte layer 28, and the ion storage layer 29.

To form a transparent window or glazing that includes an electroactive device 12 as described herein, embodiments of the present invention include a manufacturing process for forming such a transparent window or glazing. Broadly, the manufacturing process may generally comprise the lamination of an electroactive package (as described above) between a pair of substrates, such as layers of glass. In more detail, the process may include an initial step of providing a first substrate layer 44. As previously indicated, in some embodiments, the substrate layer 44 may be a layer of glass. Next, a layer of laminating adhesive 52 may be applied to the first substrate layer 44. The laminating adhesive 52 may comprise various materials sufficient to perform the lamination described herein. For instance, in some embodiments, the laminating adhesive 52 may comprise a PVB sheet. In some embodiments, the laminating adhesive 52 may be applied to the first substrate layer 44 at an elevated temperature to facilitate the softening and/or melting of the PVB sheet. Next, an electroactive package may be applied to the first substrate layer 44 via the laminating adhesive 52 (i.e., is positioned on the laminating adhesive 52). As previously discussed, the electroactive package may comprise a pair of transparent conductive layers 16, 17 opposing an active film 14. In some embodiments, the electroactive package may further comprise a pair of polymer layers 18, 19 opposing the transparent conductive layers 16, 17 and the active film 14. In addition, the pair of transparent conductive layers 16, 17 may include overhang sections 38 that extend beyond the active film 14 so as to present a peripheral space that extends around the periphery of the electroactive package. In some embodiments, the electroactive package may be cut to size from a roll of electroactive package multilayer material. In some embodiments, cutting the electroactive package may result in a smooth edge, so as to require that one or more sides of the electroactive package has a portion of the active film 14 deleted from between transparent conductive layers 16, 17 so as to create the peripheral space around the entire periphery of the electroactive package. Such deletion of the active film 14 may be performed by chemical etching, laser ablation, scraping, or the like.

The manufacturing process may include an additional step of inserting the bus bar 20 in the peripheral space around the periphery of the electroactive package. As previously discussed, the bus bar 20 may comprise a pair of electrically-conductive layers 22, 24 opposing an insulative layer 26. In general, the bus bar 20 may be inserted such that the exterior surfaces 46 of the electrically-conductive layers 22, 24 are in contact with the overhang sections 38 of the transparent conductive layers 16, 17. In some embodiments, peripheral portions of the transparent conductive layer 16, 17 may be required to be gently flexed apart from each other to facilitate insertion of the bus bar 20. In certain embodiments, the electrically-conductive layers 22, 24 may include adhesive and/or tape on their exterior surfaces 46 so as to facilitate secure engagement within the peripheral space of the electroactive package and to maintain contact with the transparent conductive layers 16, 17. Furthermore, the bus bar 20 may be inserted such that it does not interfere with the active film 14. As such, in some embodiments, such as illustrated in FIGS. 2 to 5, a gap 58 may exist between the bus bar 20 and the active film 14. In certain embodiments, a "plug" may be provided in this gap, while in other cases, the electroactive device 12 may not require a "plug" or other blocking material to be positioned between the bus bar 20 and the active film 14.

The bus bar 20 may be inserted in such a manner that at least a portion of the bus bar 20 extends beyond the electroactive package, and specifically, beyond the transparent conductive layers 16, 17. In other embodiments, the bus bar 20 may be inserted in such a manner that at least a portion of the bus bar 20 extends beyond the laminating adhesive 52. In still other embodiments, the bus bar 20 may be inserted in such a manner that a least a portion of the bus bar 20 extends beyond the substrates 44.

A next step of the manufacturing process may include applying an additional layer of laminating adhesive 52 over the electroactive package and the first substrate layer 44. An additional step of the process may include applying a second substrate layer 44, which may be a glass sheet, over the electroactive package and the intervening laminating adhesive 52, so as to create the transparent window or glazing (may also referred to as the laminate). To ensure that no air or gasses are trapped in the electroactive device 12 and/or in the resulting transparent window or glazing, the electroactive device 12 may be placed in a vacuum environment (before, during, and/or after insertion of the bus bar 20) to promote de-airing of the electroactive device 12 and/or the transparent window or glazing. Finally, in some embodiments, the resulting transparent window or glazing may be introduced to an autoclave, or other method known in the art, to be conditioned at an elevated temperature and/or elevated pressure so as to facilitate further softening and/or melting of the lamination adhesive so as to finalize lamination of the transparent window or glazing. In some embodiments, such elevated temperatures may also soften and/or melt the insulative layer 26 of the bus bar 20 so as to ensure that the thickness of the bus bar 20 generally matches the thickness of the active film 14.

The electroactive device 12 described above can be implemented in various applications such as in window transparencies or glazings for vehicles and buildings. For example, as illustrated in FIG. 1, the electroactive device 12 can be integrated in a vehicle windshield 10. As such, the electroactive device 12 may comprise an electroactive dynamic device that can be used to selectively darken or lighten the vehicle windshield 10, so as to restrict or increase, respectively, the amount of light allowed to pass therethrough. As such, for instance, on a warm, sunny day, a user of the vehicle could decide to darken the vehicle windshield 10 so as to restrict the amount of sunlight allowed to pass inside the vehicle, thereby reducing the amount by which the interior of the vehicle is heated. On the other hand, on a cold day, a user of the vehicle could decide to lighten the vehicle windshield 10 so as to increase the amount of sunlight allowed to pass inside the vehicle, thereby increasing the amount by which the interior of the vehicle is heated. As previously described, such darkening and lightening of the vehicle windshield may performed by applying varying voltage potentials across the active film 14 of the electroactive device 12. Specifically, the electrically-conductive layers 22, 24 of the bus bar can electrically connect the transparent conductive layers 16, 17 to a power source to, therefore, generate a voltage potential across the active film 14 and induce an electrical current therethrough. For example, to darken the window 10 (i.e., to energize the active film 14), the electroactive device 12 may be configured as shown in FIGS. 2 to 5, with a negative pole connected to the electrically-conductive layer 22 and a positive pole connected to the electrically-conductive layer 24. In such a configuration, electrons may flow from the negative pole connected to the electrically-conductive layer 22, through the transparent conductive layer 16, through the active film 14, through the transparent conductive layer 17, through the electrically-conductive layer 24, and to the positive pole. Contrastingly, to lighten the window 10 (i.e., to de-energize the active film 14), the polarity of the poles may be switched. In such a configuration, electrons may flow from the negative pole connected to the electrically-conductive layer 24, through the transparent conductive layer 17, through the active film 14, through the transparent conductive layer 16, through the electrically-conductive layer 22, and to the positive pole.

Beneficially, the electroactive device 12 of embodiments of the present invention provides several advantages over previously-used electroactive devices. For example, the bus bar 20 can be connected with the electroactive package around generally the entire periphery of the electroactive package. As such, the bus bar 20 can provide electrical connection to each of the transparent conductive layers 16, 17 around the entire periphery of the electroactive device 12. Furthermore, however, the insulative layer 26 of the bus bar 20 ensures that the transparent conductive layers 16, 17 are electrically isolated from each other so as to avoid short circuits and malfunction of the electroactive device 12. By providing electrical connections to each of the transparent conductive layers 16, 17 around generally the entire periphery of the electroactive device 12, a voltage potential can be applied across transparent conductive layers 16, 17 in a more uniform manner so as to increase the current-carrying capability of the transparent conductive layers 16, 17 to the active film 14. As such, embodiments of the present invention provide reduced switching times for the active film 14, and reduce visible "lensing" or "iris" effects across the electroactive device 12. Such benefits are realized when compared to certain previously-used electrochromic devices, in which electrical connections were made only at discrete locations around the devices, thereby reducing the current-carrying capabilities of the devices, which caused increased switching times and visible lensing or iris effects.

To facilitate the ability of the bus bar 20 to provide electrical connection to the transparent conductive layers 16, 17 around the entire periphery of the electroactive package, the bus bar 20 may, as previously described, be flexible. As such, the bus bar may conform to the contours of the electroactive device 12 and/or to the transparent window or glazing with which the electroactive device 12 is integrated. For example, certain vehicle windshields are curved so as to provide an aerodynamic surface for the vehicle. Generally, the components of the electroactive package (e.g., active film 14, transparent conductive layers 16, 17, and polymer layers 18, 19) may be formed to be flexible so as to conform to the contour of such vehicle windshields. Similarly, as noted above, the bus bar can also be flexible so as to be configurable to match the contours (i.e., both surface contours and edge contours) of the electroactive device 12 and, thus, the vehicle windshield 10. Such flexibility is also beneficial in that it enhances the durability of the electroactive device 12 by reducing the probability that the bus bar 20 will break under various stresses imparted to the bus bar 20 during manufacture of the electroactive device 12 and during use of the transparent window or glazing within which the electroactive device 12 is incorporated. In some previously-used electrochromic devices, for instance, the electrical connections to the transparent conductive layers were rigid, and as such, were prone to breakage, fracture, and/or delamination.

The durability of the bus bar 20 may also be enhanced by using materials for the electrically-conductive layers 22, 24, and for the insulative layer 26 that are generally more durable. In contrast to the components of the electroactive package, which are selected specifically for their optical properties, the optical properties of the bus bar 20 are not as important because the bus bar 20 will generally be positioned at the periphery of the electroactive device 12 and/or the transparent window or glazing. As such, the bus bar 20 can be formed from materials that have higher durability, without requiring that such materials have specific optical properties. In more detail, as illustrated in FIG. 1, the bus bar 20 is positioned at the periphery of the electroactive device 12 and/or vehicle windshield 10. As such, the bus bar 20 may be positioned under edging material 60 that covers and surrounds the periphery of the vehicle windshield 10 and the electroactive device 12 (including the bus bar 20). As such, the optical properties of the bus bar 20 are not generally relevant, and the bus bar 20 can, instead, be formed from materials that have beneficial electrical and structural properties but do not have necessary optical properties required for the electroactive package.

The durability of the electroactive device 12 may be even further enhanced by certain embodiments which require the thickness of the bus bar 20 to match the thickness of the active film 14. Such a thickness matching provides for the peripheral portions of the electroactive package components to be impacted by reduced stress forces during manufacture and use of the electroactive device 12. For instance, in previously-used electroactive devices, the transparent conductive layers often required modification, such as cutting back or otherwise re-shaping portions of the layers, so as to facilitate an electrical connection. Embodiments of the present invention alleviate the need for such modifications of the transparent conductive layers 16, 17 by providing for the thickness of the bus bar 20 to match the thickness of the active film 14. As such, the bus bar 20 is sized appropriately for the electrically-conductive layers 22, 24 to contact the transparent conductive layers 16, 17 without any modifications being made to the transparent conductive layers 16, 17. As such, the thickness of the transparent conductive layers 16, 17 can be generally uniform about the electroactive device 12 so as to provide for structural integrity of the transparent conductive layers 16, 17, to reduce linear stress concentrations around the periphery of the transparent conductive layers 16, 17, and to provide uniform and consistent electrical conductivity about the transparent conductive layers 16, 17. Such reduced stresses on the transparent conductive layers 16, 17 can be realized during manufacture of the electroactive device 12 and/or transparent window, as well as during the operational life of the transparent window. The size matching between the bus bar 20 and the active film 14 may also reduce the stresses experienced by the transparent conductive layers 16, 17, as the bus bar 20 can provide additional support to the transparent conductive layers 16, 17.

It should be understood that while a significant portion of the above detailed description described electroactive devices 12 in the form of electroactive dynamic devices, such as electrochromic and PDLC devices, the electroactive devices 12 of embodiments of the present invention may similarly include electroactive voltaic devices, such as photovoltaic devices. In such embodiments, the structure of the electroactive devices 12 may be the same as or similar to that described above and illustrated in FIGS. 2 to 5. However, the functionality of the electroactive devices 12 may be different. For example, in electroactive voltaic devices in the form of photovoltaic devices, the active film may generate a current when it is exposed to sunlight or other light sources. As such, and with reference to FIGS. 2 and 3, an electrical current may be generated by the active film 14, such that electrons flow from the negative pole connected to the electrically-conductive layer 22, through the transparent conductive layer 16, through the active film 14, through the transparent conductive layer 17, through the electrically-conductive layer 24, and to the positive pole. As such, electrical current can be provided by the electroactive device 12 to a separate electronics device (e.g., an electrical storage device) for immediate or future use. Nevertheless, all of the benefits described above with respect to electroactive devices 12 in the form of an electroactive dynamic devices, such as durability and electrical connection benefits, may apply equally to electroactive devices 12 in the form of electroactive voltaic devices.

Although the invention has been described with reference to the preferred embodiment illustrated in the attached drawing figures, it is noted that equivalents may be employed and substitutions made herein without departing from the scope of the invention as recited in the claims.

We claim:

1. An electroactive package, comprising:
an active film;
a pair of transparent conductive layers positioned on opposite sides of the active film, wherein the transparent conductive layers each include an overhang section that extends beyond an edge of the active film, and wherein the overhang sections are located at a periphery of the electroactive package; and
a bus bar extending along at least a portion of a periphery of the electroactive package and positioned between the overhang sections of the transparent conductive layers,
wherein the bus bar comprises a pair of electrically-conductive layers and an insulative layer positioned between the electrically-conductive layers,
wherein each of the electrically-conductive layers includes an inner edge separated from an outer edge by a width of the electrically-conductive layer, wherein the insulative layer includes an inner edge separated from an outer edge by a width of the insulative layer, wherein the inner edges of each of the electrically-conductive layers and the inner edges of the insulative layer are generally aligned, and wherein the outer edges of each of the electrically-conductive layers and the outer edges of the insulative layer are generally aligned,
wherein the electroactive package further comprises a pair of polymer layers positioned one on each of the transparent conductive layers on a side opposite the active film, and
wherein the polymer layers are encapsulated by a laminating adhesive.

2. The electroactive package of claim 1, wherein the bus bar extends around more than half of a periphery of the electroactive package.

3. The electroactive package of claim 1, wherein the active film comprises a solid matrix of tungsten oxide.

4. The electroactive package of claim 1, wherein the active film comprises a polymer-dispersed liquid crystal (PDLC) material.

5. The electroactive package of claim 1, wherein the transparent conductive layers each comprise a layer of metal oxide.

6. The electroactive package of claim 1, wherein a thickness of the bus bar matches a thickness of the active film.

7. The electroactive package of claim 6, wherein a thickness of the active film is greater than 10 microns (0.394 thousands of an inch).

8. The electroactive package of claim 1, wherein the electrically-conductive layers of the bus bar comprise metal sputter coated on the insulative layer.

9. The electroactive package of claim 1, wherein each of the transparent conductive layers comprises an electroactive contact surface, wherein the electroactive contact surfaces face each other and are at least partially in contact with the active film.

10. The electroactive package of claim 9, wherein the bus bar is in contact with a substantial portion of the electroactive contact surfaces of the transparent conductive layers along the overhang sections.

11. The electroactive package of claim 1, further comprising at least one pair of electrically-conductive wires extending from the bus bar, wherein each wire of the pair extends from one of the electrically-conducting layers of the bus bar.

* * * * *